Feb. 13, 1934.  J. DE VRIES  1,946,573
STERILIZER
Filed April 11, 1931
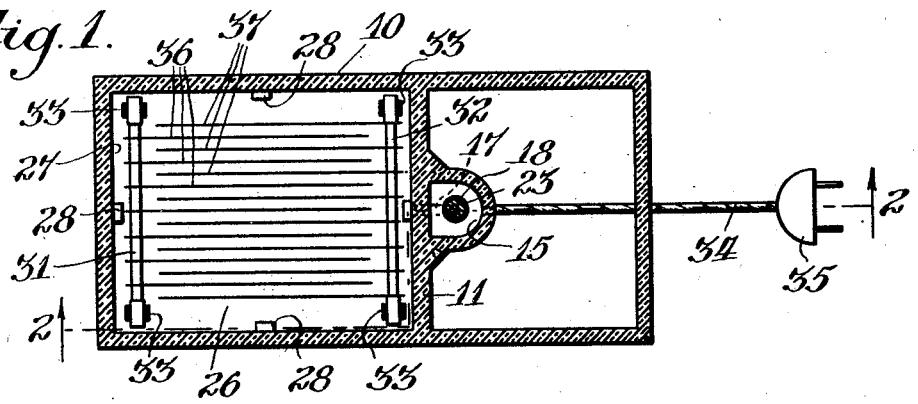
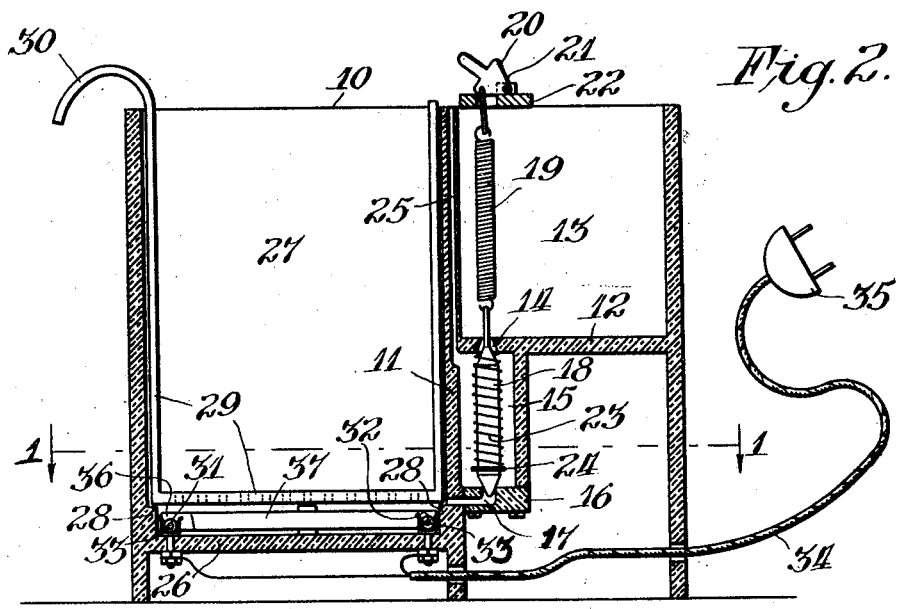
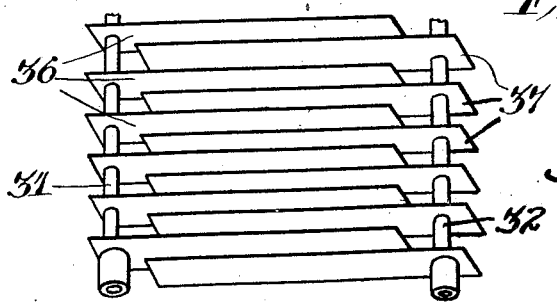
Inventor.
Jacob De Vries,
By Paul O. Pippo
Atty.

Patented Feb. 13, 1934

1,946,573

UNITED STATES PATENT OFFICE 1,946,573

STERILIZER

Jacob De Vries, Racine, Wis.

Application April 11, 1931. Serial No. 529,414

10 Claims. (Cl. 167—3)

The invention relates to a sterilizer utilizing steam or vapor for sterilizing various kinds of instruments, such for example, as dental and surgical tools.

The principal object of the invention is to provide a novel sterilizer which may comprise a portable box having a sterilizing chamber to receive a predetermined quantity of liquid from a suitable source of supply, and means in the sterilizing chamber utilizing electricity to convert the same to steam or vapor in the sterilizer chamber to sterilize instruments stored therein, and then automatically to cut off the electricity by the simple expedient of having consumed all of the predetermined quantity of liquid, which served as the conductor.

Other objects are to provide such a sterilizer of compact, simple form, which is not likely to get out of order, and which may be produced with a minimum of cost.

Still further objects will become apparent to those skilled in this art, as the disclosure progresses.

Briefly, these desirable objects may be achieved in the example of the invention herein chosen for purposes of illustration, wherein is disclosed a compact, portable, light weight box, preferably made of an electrical non-conductor material. Such box is formed with a raised storage chamber for a liquid, such as water. By means of a manually controlled valve a secondary, measuring chamber receives a predetermined quantity of the water which can be run out into the bottom of the sterilizing chamber where is located a grid in communication with a source of electric current. This grid has a positive and negative side with the two sides comprising elements spaced apart to constitute a gap so that current cannot, without the presence of a conductor to close the gap, pass from one to the other. However, when the measured supply of water immerses this grid, such a conductor is provided to connect the two sides of this grid and as a result the water is instantaneously steamed off. The steam passes upwardly to sterilize instruments appropriately stored in the sterilizing chamber. As soon as all of the measured supply of water has been so consumed, the electrical current ceases to flow from one grid part to the other, because the conductor has been consumed and by this simple expedient an automatic shut-off is provided to predetermine the period of operation of the sterilizer, and to prevent burning out of any parts.

In the accompanying sheet of drawings illustrating a practicable form of the invention:

Figure 1 is a horizontal sectional view through the sterilizer as seen along the line 1—1 in Figure 2, as viewed in the direction indicated by the arrows, with the instrument carrying basket removed;

Figure 2 is a vertical sectional view through the sterilizer as seen along the broken line 2—2 in Figure 1, when viewed in the indicated direction; and, Figure 3 is a perspective, plan view, of a fragment of the grid.

The sterilizer comprises a suitable form of box generally indicated at 10 and which may be rectangular in shape and made of an electrical non-conductor such for example, as rubber, or bakelite. The end walls, as appears in Figure 2, may be extended downwardly to serve as rests for standing the box on any appropriate table, shelf, or the like. This box 10 is provided with a transverse, substantially centrally disposed partition wall 11. Said wall 11 with a raised floor 12 provides a water storage compartment 13 at a relatively high level in the box, which compartment has its bottom formed with an outlet opening or port 14. The chamber 13 is open at its top so that liquid may conveniently be supplied thereto.

Beneath the compartment reservoir 13 is a relatively small chamber 15 which may be formed as a part of the box 10, said chamber 15 being of the desired size to hold a measured quantity of liquid supplied thereto by gravity flow from the main reservoir 13. The bottom of the secondary chamber 15 may be closed by a removable bottom plate 16 so that access may be had to valve mechanism arranged therein which will now be described.

The bottom plate 16 is also provided with an outlet port 17 which is in vertical alinement with the port 14 so that a double ended needle valve 18 may play between said two ports to open and close the same alternately. This needle valve 18 has its upper end connected to a vertically disposed coil spring 19 which in turn is connected to an over dead center, triangularly shaped lever 20 fulcrumed on a pivot 21 carried on a transversely disposed cross plate 22 spanning the top of the box 10. Surrounding the valve 18 is another coil spring 23 which is relatively weaker than the spring 19, said spring 23 being stopped against a shoulder 24 fixed adjacent the lower end of said valve 18, as shown in Figure 2, and its upper end stopped against the lower side of the floor 12. The supplementary chamber 15 has a vent 25 which may pass through the partition 11 to the atmosphere.

The sterilizer box is provided at one end with a raised floor 26 which with the wall 11, heretofore described, forms a sterilizing chamber 27, the floor of which may be provided with raised pads 28 forming rests for a removable basket or cage 29 having a perforated bottom. This basket is adapted to carry the tools or instruments to be sterilized and embodies a suitable handle 30 to facilitate removal thereof with its contents after the sterilizer operation has been completed.

The port 17, it will be noted, is passed through the wall 11 so that the water or other liquid may flow from the supplementary chamber 15 to the bottom of the sterilizing chamber 27, when the valve 18 is in an open position with respect to the said port 17. This measured or given quantity of water thus flows into the bottom of the chamber 27 beneath the bottom of the basket 29. For the purpose of quickly steaming or vaporizing the liquid a novel form of electrical grid is provided which will now be described.

This grid is best shown in Figure 3, the same comprising two conductor bars 31 and 32 each appropriately carried in snap type binding posts 33 mounted in the floor 26 said posts being respectively connected to the two leads of an electric cord 34 carrying a conventional form of plug 35 to fit standard type sockets. The bar 31 carries a series of spaced, parallel members 36 in the form of blades which extend from the bar 31 at right angles thereto. Similarly the bar 32 carries members 37 which extend alternatingly between, but spaced from, the members 36. Thus, when the plug 35 is electrically connected in a socket, the two sides, 31, 36 and 32, 37 of the grid cannot pass the current without the intermediary of a conductor which will serve electrically to connect the two sides of said grid. The liquid when it flows to the bottom of the chamber 27 serves this purpose as it immerses the grid. Instantly the current flows and quickly the water steams off and passes upwardly as a hot, dry steam through the bottom of the basket 29 to sterilize its contents. Obviously when all of the predetermined or measured supply of liquid has steamed off the conductor disappears and as a consequence the current is automatically cut off because it ceases to flow. It will be seen that the grid is in no sense an electric resistance heater because it does not become hot. It is therefore cheap, foolproof, and cannot burn out.

As to the control for valve 18 a preferred example to be sure, has been shown, although it may in practice assume any other desired form. In the form herein shown the valve 18 is normally urged down by the weak spring 23 to close the port 17 and to hold port 14 open. Thus, a measured volume of water is always present in chamber 15 ready for use. It is to be noted that in this position of the parts the stronger spring 19 is released and not under tension. Thus, the weaker spring is enabled to function in the manner described. If the sterilizer is to be used, then the user manually flips the lever 20 over, clockwise as shown in Figure 2, whereby to tension the spring 19, thus pulling the valve 18 upwardly, overcoming the weaker spring 23, to open port 17 and close port 14. With the aid of atmosphere from vent 25 and gravity the measured quantity of water now drains into the grid space heretofore described. The lever 20 may be locked over dead center or may be provided with a catch to hold the parts in the position just described.

With this detailed description the structure and use will now be clear and it can readily be seen that all of the objects heretofore recited are achieved. It is the intention to cover all such changes and modifications of the illustrative example disclosed, which do not in material respects, depart from the spirit and scope of the invention as defined in the appended claims.

What is claimed is:

1. In a sterilizer, the combination of a portable box provided with a raised main liquid storage chamber, an auxiliary supply chamber of relatively smaller size disposed below the main chamber with a port to effect communication between said main and auxiliary chambers, a sterilizer chamber to receive the liquid from the auxiliary chamber, and a vent for the auxiliary chamber to lead atmosphere thereto, all of said chambers being arranged within the box.

2. In a sterilizer, the combination of a box provided with a raised main liquid storage chamber, an auxiliary storage chamber disposed lower than the main chamber with a port connecting the two, a sterilizer chamber disposed with its bottom lower than the auxiliary chamber with a port connecting said auxiliary and sterilizer chambers, and valve means for opening and closing said ports alternately to regulate liquid flow from the main to the auxiliary chamber or from the latter to the sterilizer chamber.

3. In combination, a sterilizer box embodying a main storage chamber, an auxiliary chamber therebeneath, a sterilizer chamber having a floor disposed at a lower level than the auxiliary chamber, a port between the main and auxiliary chambers, a port between the auxiliary and sterilizer chambers, a valve movable between said two ports and located in the auxiliary chamber, and means carried by the box and connected to control the valve for opening or closing said ports.

4. In combination, a sterilizer box embodying a main storage chamber, an auxiliary chamber therebeneath, a sterilizer chamber having a floor disposed at a lower level than the auxiliary chamber, a port between the main and auxiliary chambers, a port between the auxiliary and sterilizer chambers, said two ports being substantially in alinement, a double ended needle valve in the auxiliary chamber and movable alternately to open and close said ports, and means for actuating said valve.

5. In combination, a sterilizer box embodying a main storage chamber, an auxiliary chamber therebeneath, a sterilizer chamber having a floor disposed at a lower level than the auxiliary chamber, a port between the main and auxiliary chambers, a port between the auxiliary and sterilizer chambers, said two ports being substantially in alinement, a double ended needle valve in the auxiliary chamber and movable alternately to open and close said ports, a spring normally urging the valve to close the port between the auxiliary and sterilizer chambers and to hold the other port open, and lever operated connections for oppositely moving the valve against the pull of said spring.

6. A sterilizer formed as a box having a partition wall dividing the same into two main compartments, one of which has a raised floor to form a main storage chamber and the other a lower floor to form a sterilizer chamber, an auxiliary chamber formed between the other two chambers and below the raised floor, valve controlled ports between the auxiliary and main chambers and between the auxiliary and sterilizer chambers, and a vent to supply atmosphere to the auxiliary chamber.

7. In a sterilizer, the combination of a box provided with a main liquid storage chamber, an auxiliary storage chamber having a port for communication with said main chamber, a sterilizer chamber having communication through a port with said auxiliary chamber, all of said chambers being arranged within said box, a grid in said sterilizer chamber, said grid being electrically connected but ineffective to pass the current until immersed in liquid supplied from the auxiliary chamber, and a manually actuated valve for causing a predetermined amount of water to immerse the grid to be transformed into steam.

8. In combination, a sterilizer box embodying a main storage chamber, an auxiliary chamber therebeneath, a sterilizer chamber having a floor disposed at a lower level than the auxiliary chamber, a port between the main and auxiliary chambers, a port between the auxiliary and sterilizer chambers, a valve movable between said two ports and located in the auxiliary chamber, means to control the valve for opening and closing said ports, and a grid in the sterilizer chamber comprising a break in an electrical circuit which becomes closed when immersed in liquid supplied from the auxiliary chamber to pass the current and vaporize the liquid for use in the sterilizing chamber.

9. A sterilizer formed as a box having a partition wall dividing the same into two main compartments one of which has a raised floor to form a main storage chamber and the other a lower floor to form a sterilizer chamber, an auxiliary chamber formed between the other two chambers and below the raised floor, valve controlled ports between the auxiliary and main chambers and between the auxiliary and sterilizer chambers, and a flat grid located at the bottom of the sterilizer chamber, said grid comprising a break in an electrical circuit which becomes closed when immersed in liquid supplied from the auxiliary chamber to pass the current and vaporize the liquid for use in the sterilizing chamber.

10. A sterilizer formed as a box having a transverse vertical partition dividing the box into two portions, one portion having a raised floor to provide a raised liquid storage chamber, an auxiliary chamber beneath the raised storage chamber, the other portion of the box forming a sterilizer chamber having a floor below the bottom level of the auxiliary chamber, an electrical heating unit mounted on the floor of the sterilizer chamber, valve means to enable filling the auxiliary chamber with a measured quantity of fluid from the raised storage chamber, and means to enable intermittent flow of said predetermined quantity of fluid from the auxiliary to the sterilizing chamber, said fluid serving as a conductor to control the operation of the electrical heater.

JACOB DE VRIES.